June 1, 1937. W. G. HOLLINGSWORTH 2,082,246
MAP RETAINING AND DISPLAYING DEVICE
Filed June 28, 1935
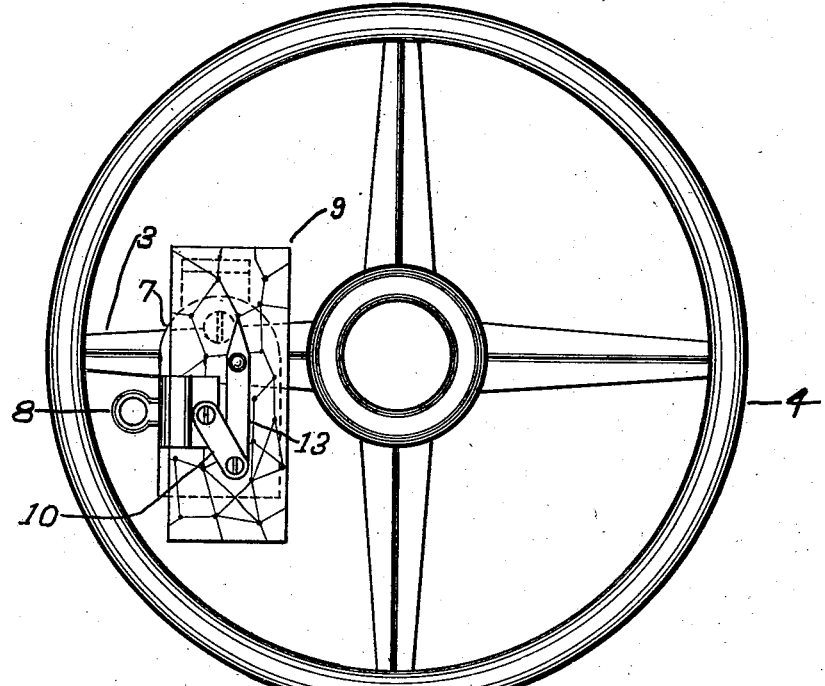
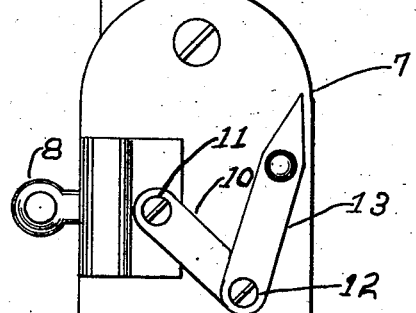
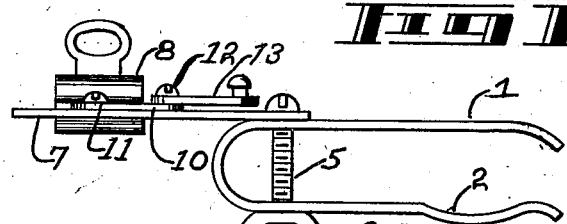
WILLIAM G.
HOLLINGSWORTH.
INVENTOR
By Lyman C. Conger
ATTORNEY Patented June 1, 1937

2,082,246

UNITED STATES PATENT OFFICE 2,082,246

MAP RETAINING AND DISPLAYING DEVICE

William G. Hollingsworth, Sheboygan, Wis.

Application June 28, 1935, Serial No. 28,837

4 Claims. (Cl. 40—11)

My invention relates to improvements in map retaining and displaying devices and the objects of my invention are, first, to provide a map retaining device which is readily attachable to the steering wheel of an automobile and which will hold a map displayed so as to be easily and conveniently read by the driver of the automobile and second, to provide means for indicating any chosen position on the map.

I attain these objects by the construction illustrated in the accompanying drawing, in which—

Figure 1 is a plan view of the device attached to the steering wheel of an automobile, Figure 2, a plan view of the device detached therefrom and Figure 3, a side elevation thereof.

Similar numerals refer to similar parts throughout the several views.

The device comprises the clamp 1, preferably shaped or hollowed at 2, whereby the device may be clamped to one of the spokes 3 of a steering wheel 4. A bolt 5, provided with a wing nut 6, serves as a means for tightening the clamp 1 and also holds the platen 7 in pivotal engagement therewith.

A spring clip 8, having its lower jaw soldered or otherwise attached to the platen 7, serves to hold the map 9 in contact with the platen. It will be noted that the platen 7, being pivotally attached to the clamp 1, is readily adjustable and may be moved to any position desired so that the map may be most easily read or understood.

In order to facilitate the location of points on the map, such as the route being traveled, so that they may be conveniently located while the automobile is in motion without requiring taking the attention from the roadway for an undue length of time, I provide locating means comprising the arm 10, pivotally mounted, as by a bolt 11, to the upper jaw of the spring clip 8 and the arm or pointer 13 pivotally attached thereto as by the bolt 12.

The pointer 13 may be adjusted so as to indicate the route being traveled and the position of the automobile thereon so that a glance suffices to indicate the route to the driver.

The map 9 may be quickly inserted in the desired position on the platen 7 or removed therefrom by opening the spring clamp 8. It will be noted that, since the pointer 13 is attached to the upper jaw of the spring clamp it will raise the pointer from the surface of the map 9, hence it offers no impediment to the insertion or removal of the map.

It will be understood that modifications may be made without invention, hence I do not limit myself to the exact construction disclosed but claim all modifications thereof within the spirit of my invention and the scope of the appended claims.

I claim:

1. In a map retaining device, the combination of a clamp attachable to the steering wheel of an automobile, a platen pivotally attached thereto, a spring clip having its lower jaw secured to said platen and a pointer pivotally attached to the upper jaw of said spring clip.

2. In a map retaining device, the combination of a clamp attachable to the steering wheel of an automobile, a platen pivotally attached thereto, a spring clip attached to said platen and a pointer pivotally attached to said spring clip.

3. In a map retaining device, the combination of a clamp comprising a pair of jaws to grip the steering wheel of an automobile, a bolt and nut adapted to close said jaws whereby to attach said clamp to said steering wheel, a platen pivotally attached to said clamp by said bolt and nut and a spring clip attached to said platen.

4. In a map retaining device, the combination of a clamp comprising a pair of clamping arms adapted for engagement with the steering wheel of an automobile, a platen, a spring clip attached to said platen, a bolt extending through said clamping arms and said platen and a nut having threaded engagement with said bolt whereby said clamp may be secured to the steering wheel of an automobile and said platen simultaneously pivotally attached to said clamp.

WILLIAM G. HOLLINGSWORTH.